United States Patent
Liu et al.

(10) Patent No.: US 9,580,316 B2
(45) Date of Patent: Feb. 28, 2017

(54) METHOD FOR PREPARING METAL COMPLEX HYDRIDE NANORODS

(71) Applicant: ZHEJIANG UNIVERSITY, Hangzhou, Zhejiang Province (CN)

(72) Inventors: Yongfeng Liu, Hangzhou (CN); Yuepeng Pang, Hangzhou (CN); Hongge Pan, Hangzhou (CN); Mingxia Gao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 351 days.

(21) Appl. No.: 14/380,662

(22) PCT Filed: Oct. 30, 2013

(86) PCT No.: PCT/CN2013/086220
§ 371 (c)(1),
(2) Date: Aug. 22, 2014

(87) PCT Pub. No.: WO2015/014034
PCT Pub. Date: Feb. 5, 2015

(65) Prior Publication Data
US 2016/0244329 A1    Aug. 25, 2016

(30) Foreign Application Priority Data
Aug. 2, 2013 (CN) .......................... 2013 1 0335388

(51) Int. Cl.
C01B 6/24 (2006.01)
C01B 3/00 (2006.01)
B82Y 40/00 (2011.01)
B82Y 99/00 (2011.01)

(52) U.S. Cl.
CPC ................. *C01B 6/24* (2013.01); *C01B 3/001* (2013.01); *B82Y 40/00* (2013.01); *B82Y 99/00* (2013.01); *Y02E 60/324* (2013.01); *Y10S 977/762* (2013.01)

(58) Field of Classification Search
CPC .......... C01B 6/24; C01B 3/001; B82Y 40/00; B82Y 99/00; Y02E 60/324; Y10S 977/762
See application file for complete search history.

(56) References Cited

U.S. PATENT DOCUMENTS 7,608,233 B1 * 10/2009 Ronnebro ............. C01B 3/0026
423/286
8,147,788 B1 * 4/2012 Ronnebro ............. C01B 3/0026
423/286

FOREIGN PATENT DOCUMENTS

CN    1632979    6/2005

* cited by examiner

*Primary Examiner* — Stanley Silverman
*Assistant Examiner* — Syed Iqbal
(74) *Attorney, Agent, or Firm* — Jiwen Chen (57) ABSTRACT

A method for preparing metal complex hydride nanorods, comprising the steps of: (1) preparing one-dimensional coordination polymers by mixing metal complex hydrides with organic solvents and subsequent drying; (2) preparing coordination polymer nanostructures by mechanical milling the one-dimensional coordination polymers that obtained from step (1), in which the one-dimensional coordination polymers are vaporized and then deposited onto the substrate; (3) preparing metal complex hydride nanorods by removing the organic ligands from the coordination polymer nanostructures that obtained from step (2). This method is simple and feasible, and exhibits excellent generality. Moreover, the purity of the metal complex hydrides nanostructures is high.

6 Claims, 12 Drawing Sheets

METHOD FOR PREPARING METAL COMPLEX HYDRIDE NANORODS

This is a U.S. national stage application of PCT Application No. PCT/CN2013/086220 under 35 U.S.C. 371, filed Oct. 30, 2013 in Chinese, claiming the priority benefit of Chinese Application No. 201310335388.6, filed Aug. 2, 2013, which is hereby incorporated by reference.

FIELD OF THE TECHNOLOGY

The present invention relates to the preparation of nanoscaled materials. More particularly, the present invention relates to the preparation method of metal complex hydride nanorods.

BACKGROUND OF THE INVENTION

Materials in nanoscale may possess new physical and/or chemical properties. For the development of nanotechnology, the most fundamental and important issue is the simplicity and controllability of the preparation method of nanoscaled materials.

There are a large number of reports on the preparation of nanoscaled materials, but there are still some nanoscaled materials that cannot be prepared by the current methods, such as nanoscaled metal complex hydrides, which are not thermodynamically stable enough and extremely chemically active (can react with $H_2O$ and $O_2$). No method exists for the synthesis of nanoscaled complex hydrides with less than 50 nm in size up to now.

The emission of greenhouse gasses and the depletion of non-renewable energy resources are two critical problems for human beings. Hydrogen energy is one of the promising solutions to the problems. Hydrogen energy is based on the reaction between $H_2$ and $O_2$ to produce energy and $H_2O$, which is absolutely clean. At present, the efficient and safe hydrogen storage techniques are the key barrier that prevents hydrogen energy from mobile applications (such as fuel cell vehicles and portable computers and cell phones).

In the past decades, researchers have developed four hydrogen storage techniques, i.e., liquid hydrogen storage systems, compressed hydrogen gas storage systems, cryo-adsorption hydrogen storage systems, and hydrides solid hydrogen storage systems. Among them, liquid hydrogen storage systems and compressed hydrogen gas storage systems are mainly utilized for large scale or stationary purpose due to their heavy and expensive containers.

Cryo-adsorption hydrogen storage systems have relatively high gravimetric and volumetric hydrogen storage densities (e.g. activated carbon can store 4.5 wt % of hydrogen at liquid $N_2$ temperature, see Ahluwalia R K, Peng J K. Automotive hydrogen storage system using cryo-adsorption on activated carbon. Int J Hydrogen Energy 2009; 34:5476-87), but the strict requirement of cryogenic conditions is difficult to obtain in daily life.

Hydrides that used as solid hydrogen storage materials can be divided into two categories: metal hydrides and metal complex hydrides. Metal hydrides, such as $LaNi_5H_6$ and $MgH_2$, have been investigated in depth in the last few years. At room temperature, 1 mole of $LaNi_5$ can absorb 6 moles of H atoms under higher hydrogen pressure, and then desorb/release them under lower hydrogen pressure. The disadvantage is the low hydrogen storage capacity (less than 1.5 wt %), which cannot meet the requirement of practical applications. $MgH_2$ can store more than 7 wt % of hydrogen, but suffers from higher operating temperature (above 300° C. for desorption) and slow hydrogen charge/discharge kinetics, which also cannot meet the requirement of practical applications.

Metal complex hydrides, such as alanates, amides and borohydrides, have attracted a lot of attention recently due to their high gravimetric and volumetric capacities and relatively moderate hydrogen absorption/desorption thermodynamics/kinetics. For example, Ti-doped $NaAlH_4$ can reversibly store 4.5 wt % of hydrogen at 130° C. (see Bogdanović B, Schwickardi M. Ti-doped alkali metal aluminum hydrides as potential novel reversible hydrogen storage materials. J Alloys Compd 1997; 253:1-9); K-modified $Mg(NH_2)_2$-2LiH composite can provide a reversible hydrogen capacity of 5.2 wt % at 130° C. (see Wang J, Liu T, Wu G T, Li W, Liu Y F, Araujo C M, Scheicher R H, Blomqvist A, Ahuja R, Xiong Z T, Yang P, Gao M X, Pan H G, Chen P. Potassium-modified $Mg(NH_2)_2$/2LiH system for hydrogen storage. Angew Chem Int Edit 2009; 48:5828-32); $2LiBH_4$—$MgH_2$ composite can store more than 11 wt % of hydrogen reversibly at around 400° C. (see Vajo J J, Skeith S L, Mertens F. Reversible storage of hydrogen in destabilized $LiBH_4$. J Phys Chem B 2005; 109:3719-22). Unfortunately, none of the materials can meet the technological requirements for fuel cells, which were set by the US Department of Energy (DOE).

Recent investigations reveal that reducing the particles to nanosize can significantly improve the hydrogen storage properties of hydrides. However, owning to the relatively low thermodynamic stability and extremely high chemical activity of the hydrides (easily reacting with $H_2O$ and $O_2$), almost all the current nanofabrication methods is not feasible for hydrides, especially for the nanoscaled hydrides with unique morphologies.

Up to now, two indirect methods for the preparation of nanoscaled hydrides have been reported. One method is to confine metal hydrides in nano-scaffolds. Researchers found that $NaAlH_4$ and $LiBH_4$ could be impregnated into nanostructured carbon through solution submerge or high pressure melting permeatation. Encouragingly, the hydrogen absorption/desorption temperatures of the nano-confined materials were dramatically decreased in comparison with the raw materials (see Balde C P, Hereijgers B P C, Bitter J H, de Jong K P. Facilitated hydrogen storage in $NaAlH_4$ supported on carbon nanofibers. Angew Chem Int Edit 2006; 45:3501-3 and Gross A F, Vajo J J, Van Atta S L, Olson G L. Enhanced hydrogen storage kinetics of $LiBH_4$ in nanoporous carbon scaffolds. J Phys Chem C 2008; 112:5651-7). Carbon nanofiber supported $NaAlH_4$ begins liberating hydrogen at as low as 50° C. (see Balde C P, Hereijgers B P C, Bitter J H, de Jong K P. Facilitated hydrogen storage in $NaAlH_4$ supported on carbon nanofibers. Angew Chem Int Edit 2006; 45:3501-3). However, the loading efficiency of the original metal hydrides is quite low, and the huge dead weight of the scaffold lowered the overall hydrogen storage capacity to an inferior value.

The other method is to synthesize nanostructured metal first, and then hydrogenate to form nanostructured hydride. $MgH_2$ nanowires synthesized with this method exhibit a uniform diameter of about 50 nm and could absorb/desorb 7.6 wt % of hydrogen at 300° C. in 30 min (see Li W Y, Li C S, Ma H, Chen J. Magnesium nanowires: Enhanced kinetics for hydrogen absorption and desorption. J Am Chem Soc 2007; 129:6710-1). However, the particle size of the samples significantly increases after the hydrogenation. Such method is only used for single-metal-element hydrides, but cannot be used for complex metal hydrides with more than two non-hydrogen elements.

A coordination polymer is an inorganic or organometallic polymer structure containing metal cation centers linked by ligands, extending in an array. It can also be described as a polymer whose repeated units are coordination complexes. The structure of a coordination polymer can be determined to be one-, two- or three-dimensional, depending on the number of directions in space to which the array extends. One type of special one dimensional coordination polymer is formed by metal coordination hydride and organic ligand, and the organic ligand can be removed under the condition that the metal hydride decomposes.

For example, $Mg(AlH_4)_2 \cdot Et_2O$ coordination polymer (see Fichtner M, Fuhr O. Synthesis and structures of magnesium alanate and two solvent adducts. J. Alloys Compd 2002:345: 286-96), $LiBH_4 \cdot X$ coordination polymers (X is $Et_2O$, MTBE (methyl tert-butyl ether) or THF (Tetrahydrofuran), see Giese H H, Noth H, Schwenk H, Thomas S. Metal tetrahydridoborates and tetrahydridometallates. 22—Structural chemistry of lithium tetrahydroborate ether solvates. Eur J Inorg Chem 1998:941-9 and Ruiz J C G, Noeth H, Warchhold M. Coordination compounds of alkali metal tetrahydroborates with ethers and amines. Eur J Inorg Chem 2008: 251-66), $Ln(BH_4)_2 \cdot 2THF$ coordination polymers (Ln is Eu and Yb, see Marks S, Heck J G, Habicht M H, Oña-Burgos P, Feldmann C, Roesky P W. $[Ln(BH_4)_2(THF)_2]$ (Ln is Eu, Yb)—A Highly Luminescent Material. Synthesis, Properties, Reactivity, and NMR Studies. J. Am. Chem. Soc. 2012; 134:16983-6), and so on. These materials have a same structural feature, i.e., the molecular structure is one-dimensional chain-shaped, in which the complex hydrides act as a framework with organic ligands shielding their edge.

DESCRIPTION OF THE INVENTION

The present invention provides a preparation method of metal complex hydride nanorods. The method is simple to operate, convenient to implement and has excellent broad applicability. In addition, the purity of the metal complex hydride nanorods is high.

A method for preparing metal complex hydride nanorods, comprising the steps of:

(1) preparing one-dimensional coordination polymers by mixing metal complex hydrides with organic solvents and subsequently drying.

After mixing metal complex hydrides with organic solvents, the complex hydrides grow linearly to form a chain-shaped structure, in which the metal complex hydrides act as a framework, the organic solvent and the metal in the metal complex hydrides form ligand bond and providing protection.

The chain-shaped metal complex hydrides and the organic solvent (i.e. organic ligand) that wraps around the chain-shaped metal complex hydrides and forms the ligand bond are called as one-dimensional coordination polymers.

The organic ligands usually include the solvent with ethers, in which the oxygen (O) atoms have electron pairs that are not shared and can easily coordinate with metals by the coordination between the lone pair electrons and the non-occupied orbitals. The organic ligands can shield the chain-shaped one-dimensional complex hydrides. Preferably, the organic ligands are ethyl methyl ether, methyl propyl ether, diethyl ether ($Et_2O$), ethyl propyl ether, methyl tertiary butyl ether (MTBE), tetrahydrofuran (THF) and ethylene oxide.

After the metal complex hydrides are mixed with organic solvents, stirring is necessary in order to sufficiently mix the metal complex hydrides with organic solvents to and form stable coordination bonds. Generally, the stirring time is no less than 40 min.

The purpose of the drying process is to remove the uncoordinated organic solvents. The coordinated organic solvents became organic ligands, separating the chain-shaped metal complex hydrides from each other.

The drying process can be carried out by heat treatment at a temperature higher than the boiling points of the corresponding organic solvents, or freeze drying treatment under low or reduced pressure.

In the drying process, it should be ensured that the coordination bonds between metal complex hydrides and organic ligands are not broken so that the subsequent step can be taken.

(2) Preparing coordination polymer nanorods by mechanical milling the one-dimensional coordination polymers that obtained from step (1), in which the one-dimensional coordination polymers are vaporized and then deposited onto and grew from a substrate.

During mechanical milling of the one-dimensional coordination polymers, the coordination polymer chains in the lattice are separated by organic ligands and interact through weak van der Waals forces. During high-energy ball milling, the intense physical forces at the collision points can easily destroy the weak van der Waals interactions, driving the coordination polymers into the vapor phase. The vaporized material eventually floats through the filter, deposits onto the substrate and self-assembles one-dimensionally according to its specific anisotropic molecular structure.

Mechanical ball milling provides energy to vaporize the coordination polymers. Therefore, all the current ball-milling techniques are applicable. Preferably, the mechanical ball mill is planetary ball mill and horizontal ball mill, and the ball-to-powder ration is 20-100:1, the speed is 300-600 r/min, and the time is 1-10 hours.

During the ball milling process, it should be ensured that the one-dimensional coordination polymers are not decomposed. For the one-dimensional coordination polymers that decompose at high temperatures, ball milling can be performed at room temperature. For the one-dimensional coordination polymers that decompose at lower temperatures, cooling equipments are necessary to maintain the materials stable, because ball milling can generate a large amount of heat and raise the temperature. Preferably, the cooling equipments are ice-water bath and dry-ice bath.

During the mechanical milling process, it should be assured that the temperature is lower than the decomposition temperatures and higher than the vaporization temperatures of the coordination polymers. Therefore, suitable ball-to-powder ratio, speed and time should be selected, and the cooling equipments are also needed.

The selection of substrates has no special limitation; stainless steel and nylon are preferable.

(3) Preparing metal complex hydride nanorods by removing the organic ligands from the coordination polymer nanostructures that obtained from step (2).

In order to obtain the coordination polymers with high purity, the ligands in the coordination polymer nanostructures should be removed. Preferably, the removal of the ligands from the coordination polymers is performed by heat treatment and vacuum treatment to prepare metal complex hydride nanorods by removing the organic ligands from the coordination polymer nanostructures that obtained from step (2).

The formation of the one-dimensional chain-shaped structure of metal complex hydrides is important for the subsequent formation of nanorods. Preferably, the metal complex hydrides are metal alanates and metal borohydrides.

Preferably, the metal elements in metal alanates are alkali metals, alkaline earth metals and lanthanides; the metal elements in metal borohydrides are alkali metals, alkaline earth metals and lanthanides.

More preferably, the metal elements in metal alanates are alkali metals and alkaline earth metals; the metal elements in metal borohydrides are alkali metals and alkaline earth metals.

The most preferably, the metal elements in metal alanates are alkaline earth metals; the metal elements in metal borohydrides are alkali metals.

Comparing to the present techniques, the method of the present invention has the following advantages:

(1) This method can be used to prepare high-purity metal complex hydride nanorods with diameter less than 100 nm.

(2) This method is simple and feasible, and generally applicable to prepare different metal complex hydride nanorods.

(3) The metal complex hydride nanorods prepared by this method exhibit good hydrogen storage properties due to their high purity and small diameter.

IMPLEMENTATION EXAMPLES OF THE PRESENT INVENTION

The structure analysis of the samples were carried out by X-ray diffraction (XRD), Fourier transform infrared spectroscopy (FTIR) and energy dispersive spectrometer (EDS). The XRD patterns were obtained by a X'Pert PRO X-ray diffractometer (PANalytical, The Netherland) operated at 40 kV and 40 mA and a measuring step of 0.05°. Fourier transform infrared spectrum was recorded using a Bruker Tensor 27 unit (Germany) in transmission mode. The pellet testing sample was prepared by cold-pressing a mixture of powder and potassium bromide (KBr) at a weight ratio of ~1:100. The energy dispersive spectrum was measured by FEI Tecnai G2 F20 S-TWIN electron microscope at 200 kV.

The hydrogen desorption properties of the samples were investigated by temperature-programmed desorption (TPD) curve and volumetric release curve. The TPD was performed by using an online mass spectrometer. Temperature-programmed desorption curve were measured by a mass spectrometer and a temperature-control heating device at a heating rate of 2° C./min under continuously flowing pure Ar at a flowing rate of 20 mL/min. The hydrogen volumetric release curve was assessed by using a hydrogen volumetric release with an initial state of vacuum at a heating rate of 2° C./min.

The morphological observations of the samples of the examples were carried out by scanning electron microscope (SEM) and transmission electron microscopy (TEM). The SEM observations were performed with a Hitachi-S4800 microscope (Japan) at 5 kV. The TEM observations were performed on a FEI Tecnai G2 F20 S-TWIN electron microscope (USA) at 200 kV.

Figure 4:
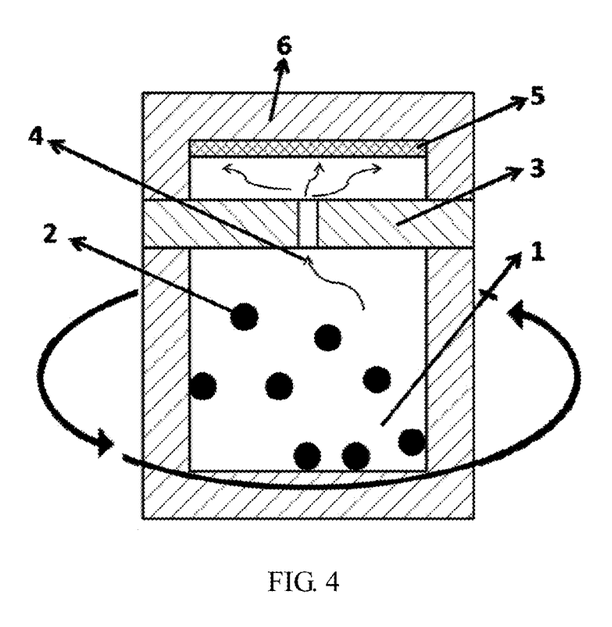
FIG. 4 shows a schematic diagram of the mechanical-force driven physical vapor deposition (MFPVD) process.

FIG. 4 shows the schematic diagram of the milling jar of the implementation examples of the present invention. The ring-like arrow indicates the rotating directions. The milling balls 2 and the raw materials are milling in the space 1. The vaporized raw materials 4 float through the tunnel of the filter 3, then contacts with the substrate 6 of the top of the milling jar, and then deposit onto the substrate 6 to form deposition 5.

Example 1

In a glovebox filled with Ar atmosphere, 1 g of $Mg(AlH_4)_2$ and 100 mL of $Et_2O$ were loaded in a flask and stirred for 60 min. Then the mixture was heated and dried at 40° C., and 1.8 g of white powder (i.e. one-dimensional coordination polymers) was obtained. Then the white powder was loaded in a milling jar equipped with a filter and a substrate, and milled at room temperature in a plenary ball mill at ball-to-powder of 60:1 and speed of 500 r/min for 1.5 hours. After the mechanical-force driven physical vapor deposition (MFPVD), the deposition (i.e. coordination polymer nanorods) was obtained on the substrate. Finally, the resultant product (i.e. metal complex hydride nanorods) was obtained by heat-treating the deposition on the substrate at 90° C. for 15 min.

XRD patterns, FTIR spectra and SEM images were obtained for the samples in different preparing stages.

Figure 1:
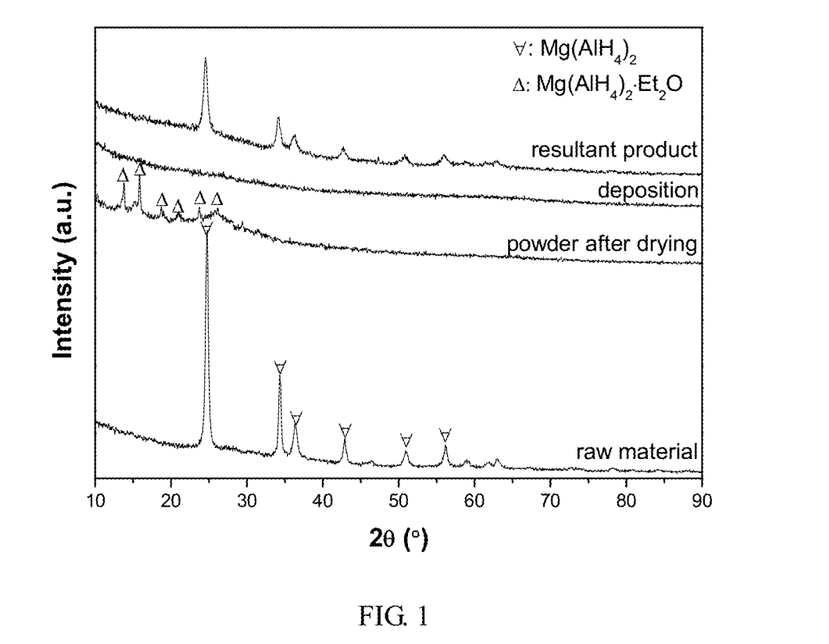
FIG. 1 shows XRD (X-ray diffraction) patterns of the products in different preparation periods in Example 1 of the present invention.

FIG. 1 shows the XRD patterns. The diffraction peaks of raw materials (i.e. $Mg(AlH_4)_2$) fit well with the typical diffraction peaks of $Mg(AlH_4)_2$. The white powder after drying exhibits the typical diffraction peaks of $Mg(AlH_4)_2.Et_2O$. There is no peaks in the XRD pattern of the deposition after MFPVD, and after heat treatment at 90° C., the typical diffraction peaks of $Mg(AlH_4)_2$ appears again for the resultant product.

Figure 2:
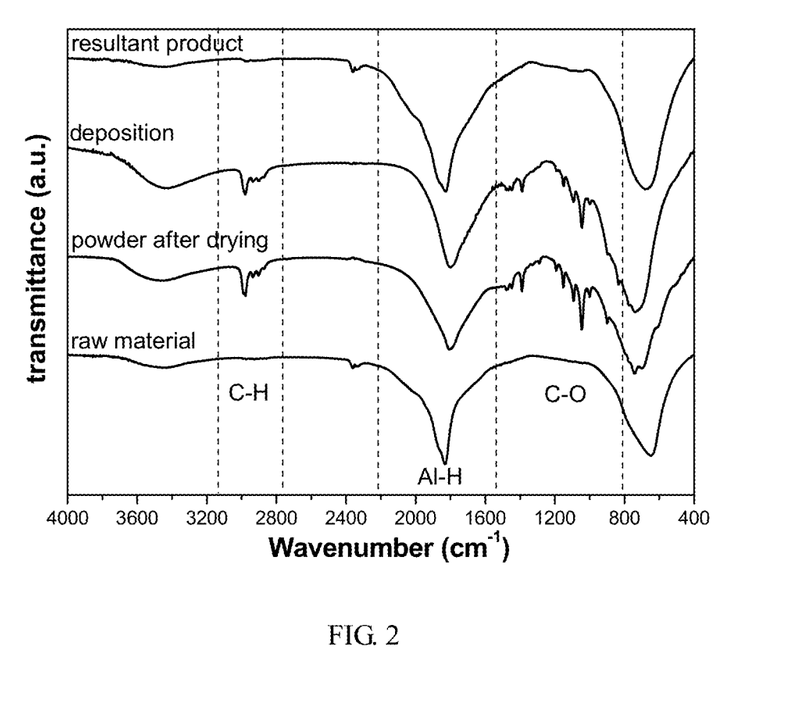
FIG. 2 shows FTIR (Fourier Transform Infrared Spectroscopy) spectra of the products in different preparation periods in Example 1 of the present invention.
Figure 3A:
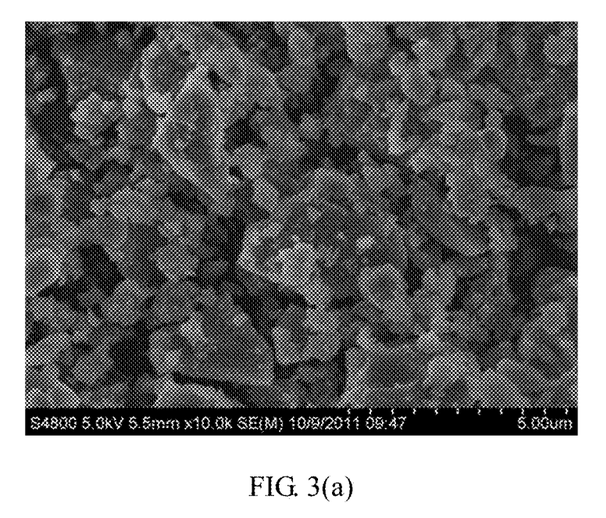
FIGS. 3(a), 3(b), 3(c) and 3(d) show respectively SEM (scanning electron microscope) images of the products in different preparation periods in Example 1 of the present invention.
Figure 3B:
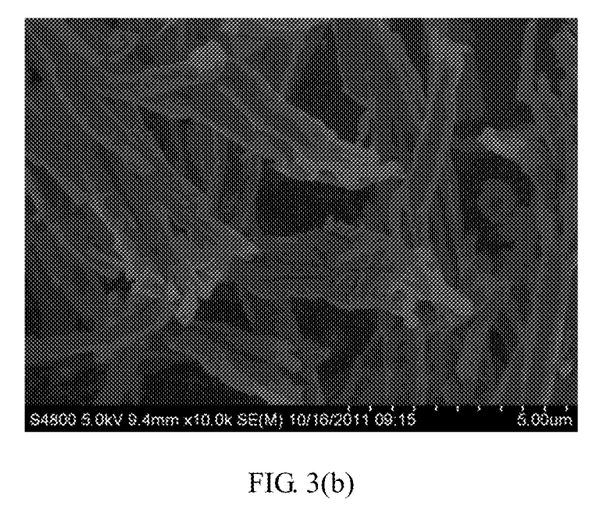
Figure 3C:
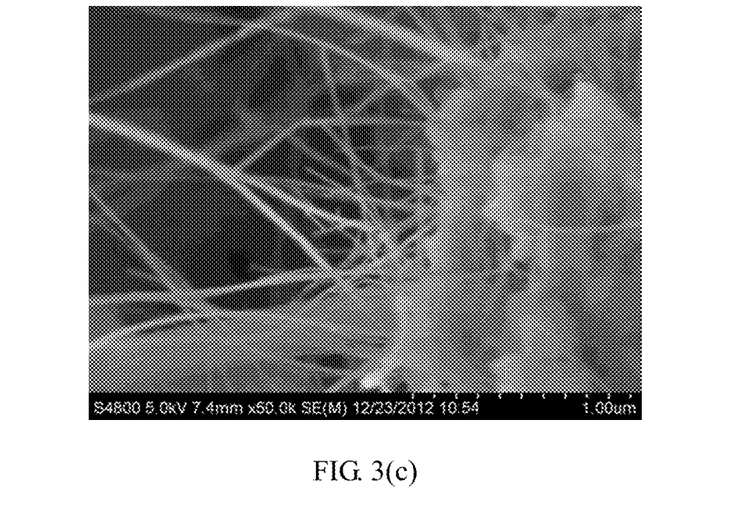
Figure 3D:
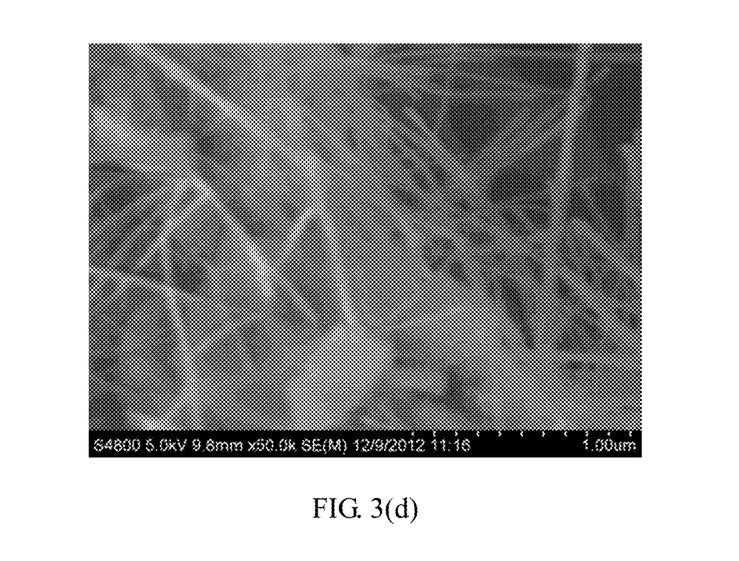

FIG. 2 shows the FTIR spectra. Only Al—H bonds can be detected for the raw material, and Al—H, C—H and C—O bonds are detected for the white powder (dried product) after drying. The spectrum of the deposition after MFPVD is almost the same as the white powder. After heat treatment at 90° C., only Al—H bonds of $Mg(AlH_4)_2$ are detected while C—H and C—O bonds disappeared.

FIG. 3 shows the SEM images. In FIG. 3(a), it can be seen that raw material is particles with different sizes and shapes. In FIG. 3(b), it can be seen that the white powder after drying is uniform microrods with length of more than 10 μm and diameter of 1 μm. In FIG. 3(c), it can be seen that the deposition after MFPVD is nanorods with a length of more than 1 μm and a diameter of 20-40 nm. In FIG. 3(d), it can be seen that the resultant product remains the nanorod-like morphology.

The above results reveal that $Mg(AlH_4)_2$ can reacts with $Et_2O$ to form $Mg(AlH_4)_2 \cdot Et2O$ microrods, and after the following MFPVD, $Mg(AlH_4)_2 \cdot Et_2O$ nanorods (i.e. the deposition) were obtained. Finally, $Mg(AlH_4)_2$ nanorods were obtained after removing the $Et_2O$ molecules by heat treatment.

As shown in FIG. 4, $Mg(AlH_4)_2 \cdot Et_2O$ microrods were milled with the milling balls 2 in the space 1 of milling jar and then vaporized. The vaporized $Mg(AlH_4)_2 \cdot Et_2O$ floats through the channel of the filter 3 and deposits onto the substrate 6 to form $Mg(AlH_4)_2 \cdot Et_2O$ nanorods.

Example 2

In a glovebox filled with Ar atmosphere, 0.5 g of $Mg(AlH_4)_2$ and 60 mL of MTBE were loaded in a flask and stirred for 40 min. Then the mixture was heated to 45° C. to dry, and 0.9 g of white powder was obtained. Then the white powder was loaded in the milling jar as shown in FIG. 4, and milled within an ice-water bath in a horizontal ball mill at a ball-to-powder ratio of 80:1 and a speed of 450 r/min for 1 hour. After mechanical-force driven physical vapor deposition, the deposition on the substrate was obtained. Finally, the resultant product was obtained by heat-treating the deposition at 95° C. for 10 min.

Figure 5:
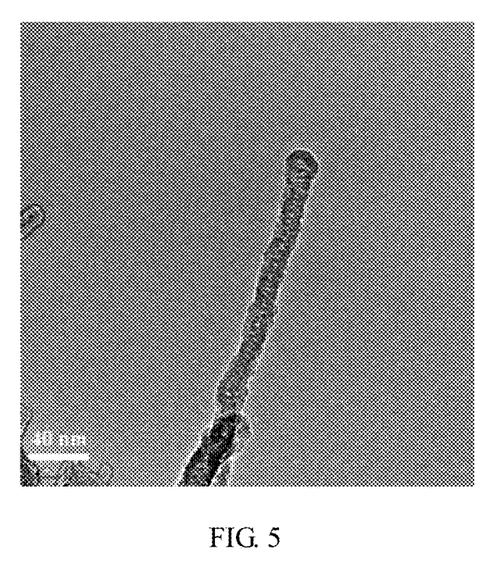
FIG. 5 shows a TEM (Transmission electron microscope) image of the resultant product in Example 2 of the present invention.

FIG. 5 shows the SEM images of the resultant product. It can be seen that the resultant product is nanorods with a diameter of 20 nm and a length of more than 200 nm.

Figure 6:
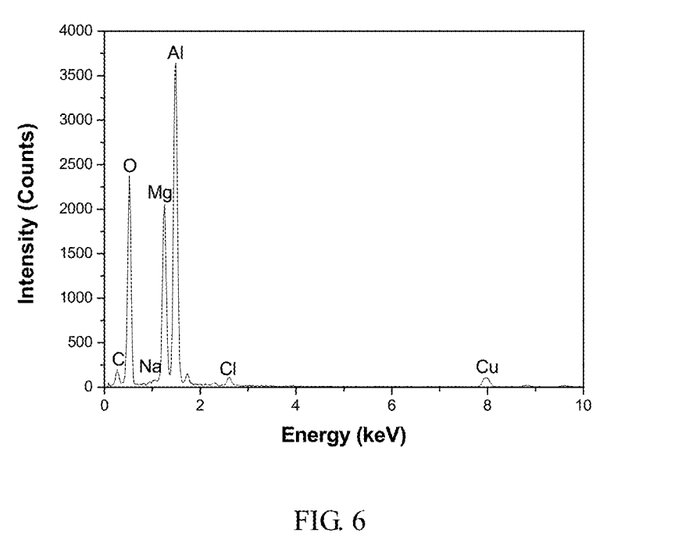
FIG. 6 shows an EDS (energy dispersive spectrometer) spectrum of the resultant product in Example 2 of the present invention.

FIG. 6 shows the EDS spectrum of the resultant product. It can be seen that Mg and Al are dominant in the resultant product, and the purity is 95%.

Example 3

In a vacuum glovebox, 2 g of $Mg(AlH_4)_2$ and 150 mL of $Et_2O$ were loaded in a flask and stirred for 60 min. Then the mixture was heated to 40° C. to dry, and 3.6 gram of white powder was obtained. Then the white powder was loaded in a milling jar equipped with a filter and a substrate, and milled within an ice-water bath in a plenary ball mill at a ball-to-powder of 50:1 and a speed of 550 r/min for 2 hours. After mechanical-force driven physical vapor deposition, the deposition on the substrate was obtained. Finally, the resultant product was obtained by vacuum treatment of the deposition for 6 hours.

Figure 7:
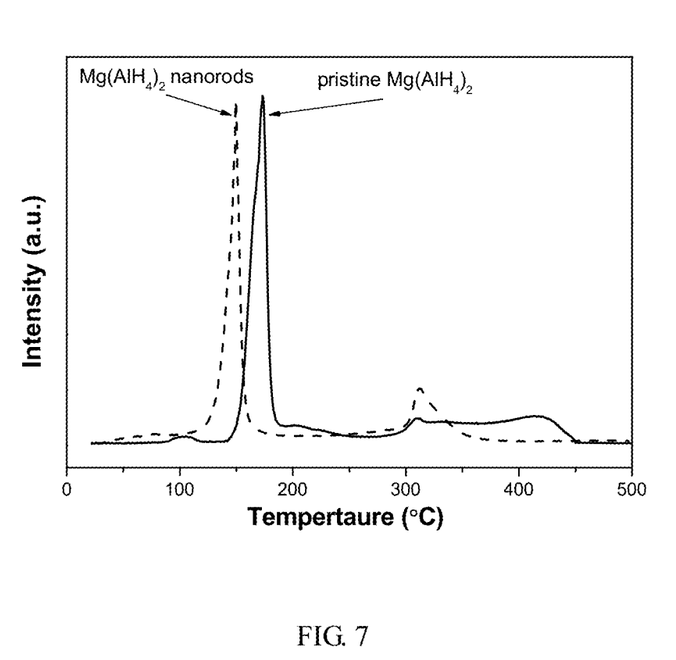
FIG. 7 shows TPD (temperature programmed desorption) curves of the raw material and resultant product in Example 3 of the present invention.

FIG. 7 shows the TPD curves of the raw material (i.e. $Mg(AlH_4)_2$) and the resultant product. It can be seen in FIG. 7 that the dehydrogenation temperature of the resultant product is lowered by 25° C. in comparison to that of the raw material.

Figure 8:
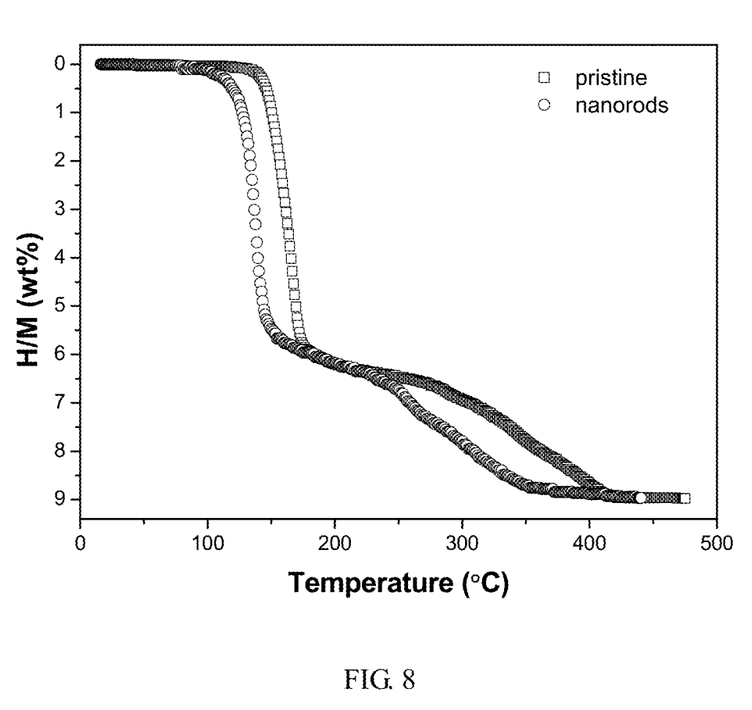
FIG. 8 shows volumetric hydrogen release curves of the raw material and resultant product in Example 3 of the present invention.

FIG. 8 shows the volumetric hydrogen release curves of the raw material and resultant product. It can be seen in FIG. 8 that the resultant hydrogen product releases 8.7 wt % of hydrogen at 450° C., and the purity is 94%.

Figure 9A:
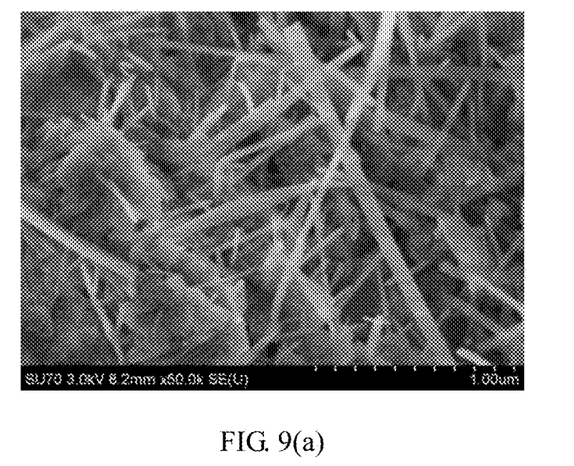
FIG. 9(a) shows a SEM image of the resultant product in Example 3 of the present invention at room temperature.
Figure 9B:
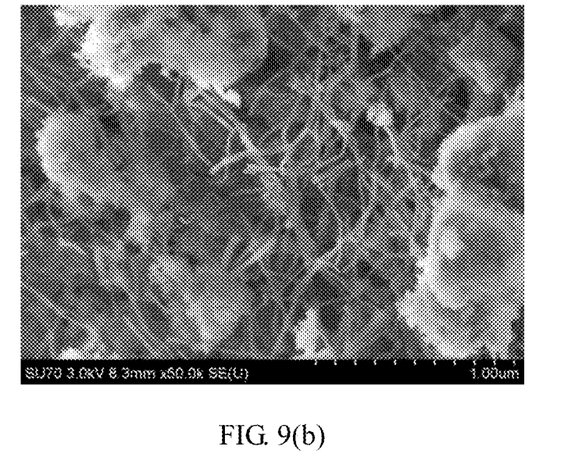
FIG. 9(b) shows a SEM image of the resultant product in Example 3 of the present invention at 200° C.
Figure 9C:
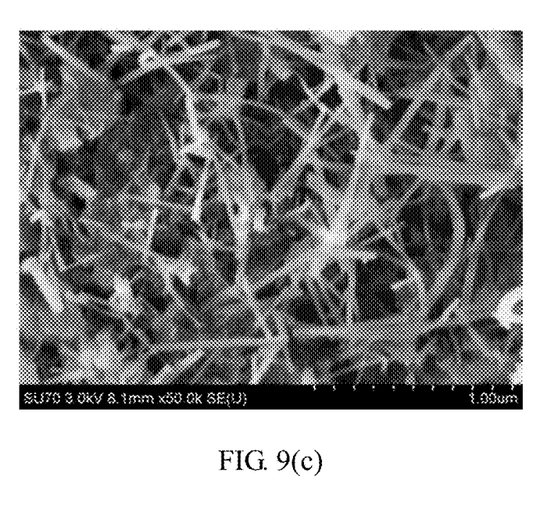
FIG. 9(c) shows a SEM image of the resultant product in Example 3 of the present invention at 400° C.

FIG. 9(a) shows the SEM images of the resultant product at room temperature. FIG. 9(b) shows the SEM images of the resultant product at 200° C. FIG. 9(c) shows the SEM images of the resultant product at 400° C. It can be seen that the morphology of the resultant product remains almost unchanged during dehydrogenation.

Example 4

In a glovebox filled with Ar atmosphere, 1 gram of $LiBH_4$ and 100 mL of MTBE were loaded in a flask and stirred for 60 min. Then the mixture was dried at −10° C. under a pressure less than 10 Pa, and 4.3 g of a white powder was obtained. Then the white powder was loaded in a milling jar equipped with a filter and a substrate, and milled within a dry-ice bath in a plenary ball mill at a ball-to-powder of 50:1 and a speed of 550 r/min for 0.5 hours. After mechanical-force driven physical vapor deposition, the deposition was obtained. The deposition is the resultant product.

Figure 10:
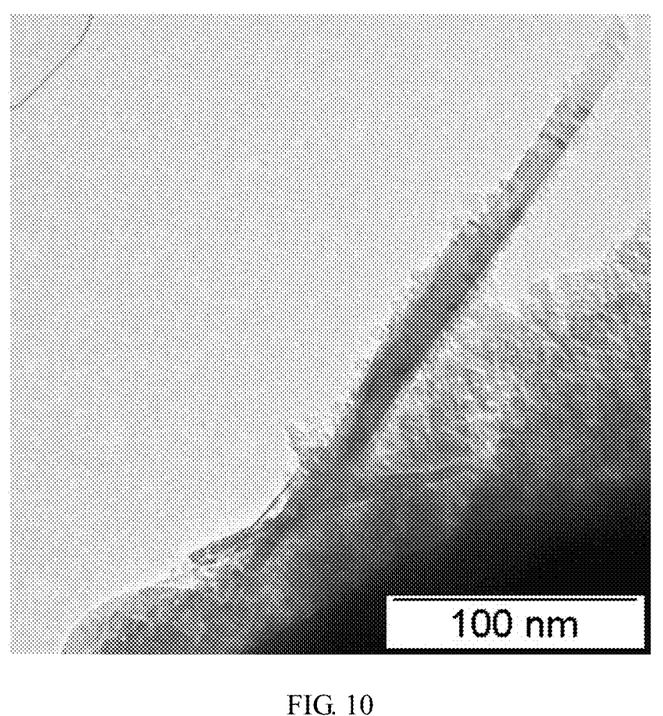
FIG. 10 shows a TEM image of the resultant product in Example 4 of the present invention.

FIG. 10 shows the TEM images of the resultant product. It can be seen that the resultant product is nanobelts with diameter of 20 nm.

Example 5

In a vacuum glovebox, 1 gram of $Eu(BH_4)_2$ and 100 mL of THF were loaded in a flask and stirred for 60 min. Then the mixture was dried at 30° C. under a pressure less than 5 Pa, and a solid powder was obtained. Then the solid powder was loaded in a milling jar equipped with a filter and a substrate, and milled at room temperature in a horizontal ball mill at a ball-to-powder of 70:1 and a speed of 550 r/min for 2 hours. After the mechanical-force driven physical vapor deposition, the deposition on the substrate was obtained. Finally, the resultant product was obtained by heat treating the deposition at 80° C. for 15 min, which is nanorods with a diameter of 30 nm.

Example 6

In a vacuum glovebox, 1 gram of $Yb(BH_4)_2$ and 100 mL of THF were loaded in a flask and stirred for 60 min. Then the mixture was dried at 30° C. under a pressure less than 5 Pa, and a solid powder was obtained. Then the solid powder was loaded in a milling jar equipped with a filter and a substrate, and milled within ice-water bath in a horizontal ball mill at a ball-to-powder of 70:1 and a speed of 550 r/min for 2 hours. After the mechanical-force driven physical vapor deposition, the deposition was obtained. Finally, the resultant product was obtained by heat treating the deposition at 80° C. for 15 min, which is nanorods with diameter of 25 nm.

The invention claimed is:

1. A method for preparing metal complex hydride nanorods, comprising the steps of:
   (1) preparing one-dimensional coordination polymers by mixing metal complex hydrides with organic solvents and subsequent drying;
   (2) preparing coordination polymer nanorods by mechanical milling the one-dimensional coordination polymers that obtained from step (1), in which the one-dimensional coordination polymers is vaporized and then deposited onto a substrate;
   (3) obtaining the metal complex hydride nanorods by removing organic ligands from the coordination polymer nanorods that obtained from step (2).

2. The method of claim 1, wherein said metal complex hydrides are metal alanates and metal borohydrides.

3. The method of claim 1, wherein said organic solvents are ethyl methyl ether, methyl propyl ether, diethyl ether (Et$_2$O), ethyl propyl ether, methyl tertiary butyl ether (MTBE), tetrahydrofuran (THF) and ethylene oxide.

4. The method of claim 1, wherein said mechanical milling are planetary ball milling and horizontal ball milling.

5. The method of claim 4, wherein the ball-to-powder ratio is 20-100:1, the speed is 300-600 r/min, and the time is 1-10 hours.

6. The method of claim 1, wherein the step (3), the organic ligands are removed by heat treatment and/or vacuum treatment of the coordination polymer nanorods that obtained in step (2) to prepare metal complex hydride nanorods.

\* \* \* \* \*